United States Patent [19]

Mitsuda et al.

[11] 4,154,057
[45] May 15, 1979

[54] EXHAUST GAS CLEANING APPARATUS OF AN INTERNAL COMBUSTION ENGINE

[75] Inventors: Tadao Mitsuda, Susono; Takeru Yasuda, Nagoya; Kazusato Kasuya, Kariya, all of Japan

[73] Assignees: Toyota Jidosha Kogyo Kabushiki Kaisha, Toyota; Aisan Industry Co., Ltd., Obu, both of Japan

[21] Appl. No.: 845,557

[22] Filed: Oct. 26, 1977

[30] Foreign Application Priority Data

Jun. 29, 1977 [JP] Japan .................................. 52-76566

[51] Int. Cl.² .................................................. F01N 3/15
[52] U.S. Cl. .......................................... 60/276; 60/290
[58] Field of Search ................................. 60/276, 290

[56] References Cited

U.S. PATENT DOCUMENTS

| 3,955,364 | 5/1976 | Lewis | 60/290 |
| 3,962,867 | 6/1976 | Ikeura | 60/290 |
| 4,060,984 | 12/1977 | Paddock | 60/290 |

Primary Examiner—Douglas Hart
Attorney, Agent, or Firm—Stevens, Davis, Miller & Mosher

[57] ABSTRACT

Disclosed is an exhaust gas cleaning apparatus of an internal combustion engine, provided with a three-way catalytic converter and a vacuum-operated flow control valve having a diaphragm for controlling the amount of secondary air directed into an exhaust manifold of the engine for an effective operation of the three-way catalytic converter. The diaphragm operates to increase or decrease the amount of secondary air in accordance with the change of vacuum force on the diaphragm, which force is generated by a vacuum signal transmitted into the valve from an intake manifold of the engine. Means are provided for compensating the difference in the vacuum levels between a high-load condition and a low-load condition so that the rate of increase in the vacuum force of the diaphragm is substantially kept near a constant value for every kind of engine condition. Thus, an ideal operation of the three-way catalytic converter can be obtained.

3 Claims, 3 Drawing Figures

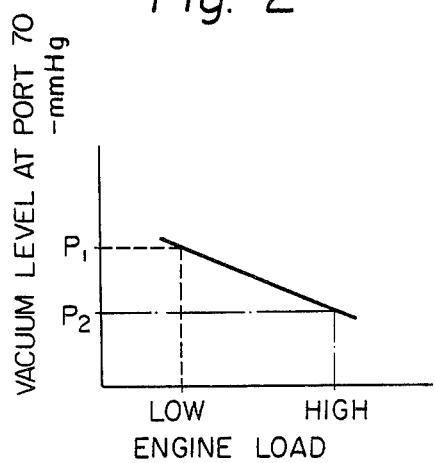
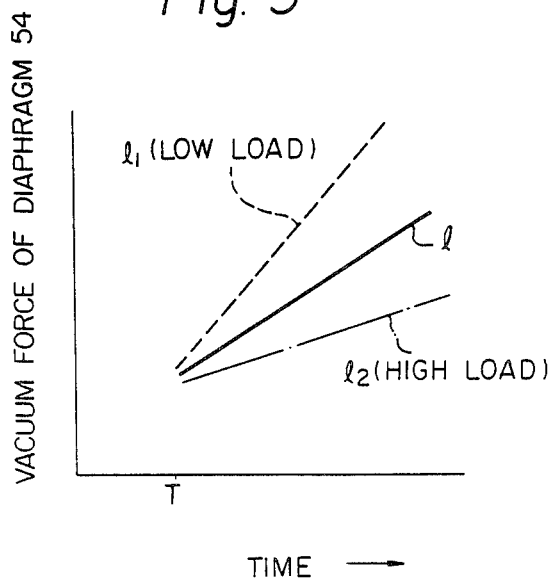

EXHAUST GAS CLEANING APPARATUS OF AN INTERNAL COMBUSTION ENGINE

FIELD OF THE INVENTION

The present invention relates to an exhaust gas cleaning apparatus for an internal combustion engine, which includes a three-way catalytic converter arranged in the exhaust system of the engine.

BACKGROUND OF THE INVENTION

Already known in the prior art is a three-way catalytic converter which can clean three major toxic components (HC, CO and NOx) in the exhaust gas. The operation of the three-way catalytic converter is effectively attained when the exhaust gas is in a state wherein excess air as well as excess fuel is not left in the exhaust gas, i.e., the air-fuel ratio of the exhaust gas (the ratio of air remaining in the exhaust gas to fuel remaining in the exhaust gas) is maintained near the stoichiometric value.

For maintaining the air-fuel ratio near the stoichiometric value, an air injection system has been provided in the prior art for controlling the amount of secondary air introduced into the exhaust manifold in accordance with electrical signals transmitted from an oxygen-concentration-cell type air-fuel sensor, for example, an $O_2$ sensor which is arranged in an exhaust pipe of the engine. This air injection system has a vacuum-operated flow control valve including a spring-urged diaphragm which forms a vacuum chamber on one side thereof. To this chamber, a vacuum signal is selectively introduced from the intake manifold of the engine in accordance with the electrical signals of the $O_2$ sensor. Thus, a vacuum force, which is increased or decreased in accordance with the electrical signals, is generated on the diaphragm for controlling the amount of the secondary air directed to the exhaust manifold.

However, this known system exhibits a drawback wherein the rate of increase in the vacuum force of the diaphragm is not kept to a constant value in every engine load condition, since the vacuum level in the intake manifold of the engine decreases in accordance with an increase in the load of the engine, i.e., an increase in the opening of a throttle valve of the engine. Thus, the rate of increase in the vacuum force of the diaphragm of the flow control valve occurring during the high load condition is lower than the rate of increase occurring during the low-load condition. Thus, the speed of change in the amount of the secondary air during the high-load condition becomes low. Therefore, due to the above reasons, an ideal air-fuel ratio control cannot be carried out, thereby causing an unsatisfactory operation of the three-way catalytic converter to occur.

SUMMARY OF THE INVENTION

An object of the present invention is to provide an exhaust gas cleaning apparatus having a vacuum-operated flow control valve, capable of maintaining a substantially constant rate for controlling the amount of secondary air.

Another object of the invention is to provide a vacuum-operated flow control valve having a spring-urged diaphragm, capable of maintaining a substantially constant rate in the increase of the vacuum force of the diaphragm irrespective of the vacuum level in the intake manifold of the engine.

In order to attain these objects, an exhaust gas cleaning apparatus of an internal combustion engine having an intake system, an engine body and an exhaust system is provided according to the present invention, such apparatus comprising:

a three-way catalytic converter disposed in the exhaust system, which converter being operable for cleaning the above-mentioned three major toxic components in the exhaust gas when the air-fuel ratio of the exhaust gas is maintained near a predetermined value;

a pipe means for introducing secondary air into the exhaust system located upstream of the three-way catalytic converter;

a vacuum-operated flow control valve device located on the pipe means, the valve device having a spring-urged diaphragm for forming a main vacuum signal chamber on one side of the diaphragm for operating the diaphragm, in accordance with the vacuum force applied thereto, to control the amount of secondary air directed to the exhaust system;

a vacuum conduit means adapted for connecting the main vacuum signal chamber with a vacuum signal port formed in the exhaust gas;

a sensor means arranged in the exhaust system for sensing the air-fuel ratio of the exhaust gas;

a vacuum signal switching valve arranged in the vacuum conduit means, such switching valve being operated by electric signals transmitted from the sensor means in such a manner that a vacuum signal at the vacuum signal port is selectively transmitted into the main vacuum signal chamber in order to selectively increase and decrease the vacuum force applied to the diaphragm for controlling the amount of secondary air so that the air-fuel ratio of the exhaust gas directed to the three-way catalytic converter is maintained near the predetermined value;

an orifice means arranged in the vacuum conduit means for controlling the transmission speed of the vacuum signal into the vacuum chamber in order to control the increase in the vacuum force applied to the diaphragm; and a vacuum means provided in the flow control valve for maintaining a substantially constant rate of increase in the vacuum force applied to the diaphragm regardless of the vacuum signal level at the vacuum signal port. As a result of this construction, a substantially constant rate of control of the amount of secondary air passed through the flow control valve toward the exhaust system is maintained in every kind of engine operating condition.

BRIEF DESCRIPTION OF THE DRAWINGS

FIG. 2 schematically shows the relationship between the load of the engine and the vacuum level at the port 70 shown in FIG. 1;

FIG. 3 schematically shows the relationships between the lapse of time occurring after the chamber 58 of FIG. 1 is opened to the port 70 and the vacuum force generated on the diaphragm 54.

DESCRIPTION OF A PREFERRED EMBODIMENT

Figure 1:
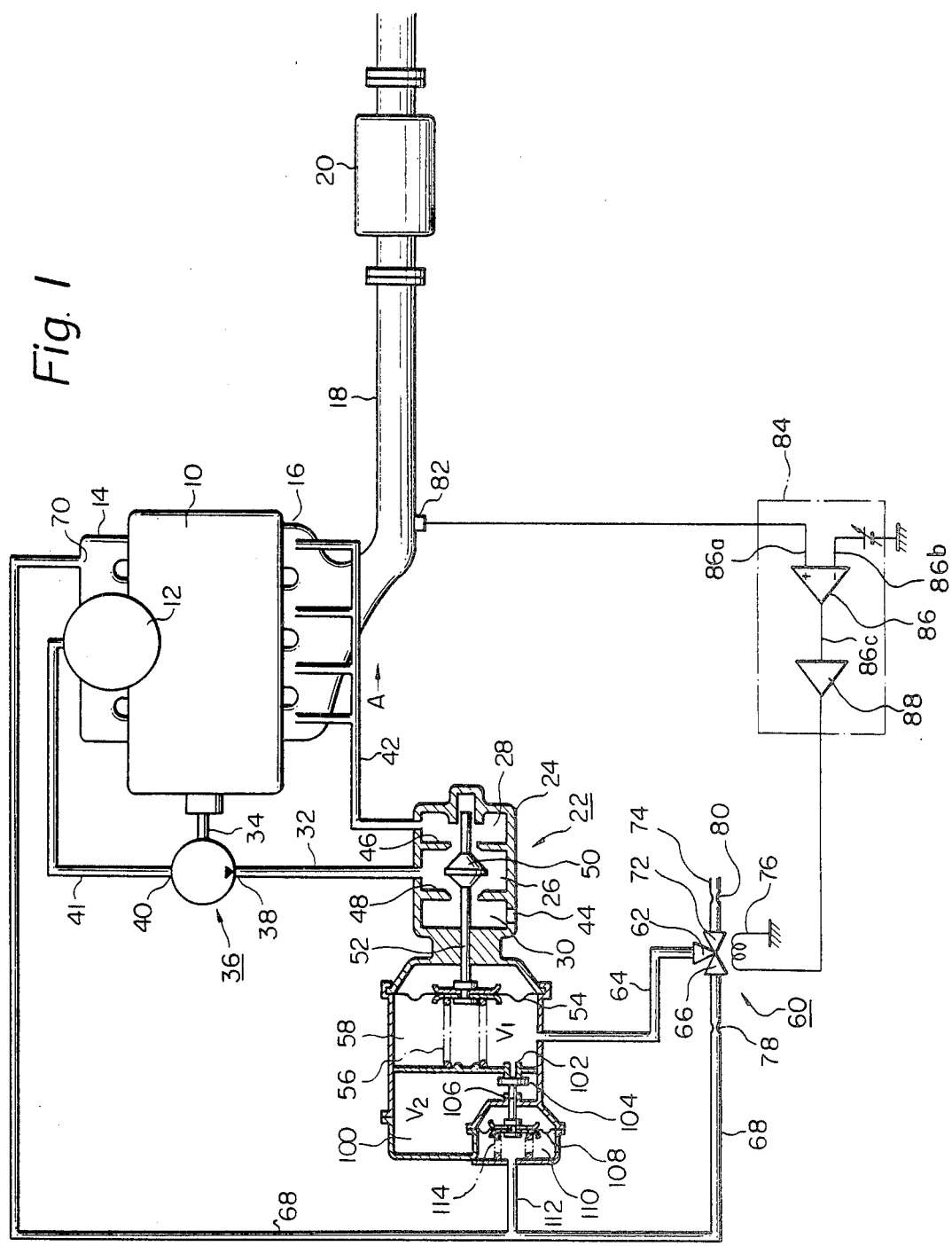
FIG. 1 is a schematic view of an exhaust gas cleaning apparatus according to the present invention.

In FIG. 1 schematically illustrating an internal combustion engine, numeral 10 designates an engine body. Intake air is introduced into the combustion chambers (not shown) in the engine body 10, via an air cleaner 12, a not-shown carburetor and an intake manifold 14. Resultant exhaust gas, due to the combustion in each of the combustion chambers, is introduced into an exhaust manifold 16, to which an exhaust pipe 18 is connected. A three-way catalytic converter 20 is located downstream from the exhaust pipe 18. The three-way catalytic converter 20 effectively operates to clean the three major toxic components in the exhaust gas, when the air-fuel ratio directed to the converter 20 is kept near the stoichiometric atmosphere.

Numeral 22 is a vacuum-operated valve for controlling the amount of secondary air introduced into the exhaust manifold 16 in response to the vacuum pressure applied to the valve 22. The valve 22 has a body 24 which forms three air chambers 26, 28 and 30. The air chamber 26 is connected, via an air pipe 32, to an air pump 36 at an outlet 38 thereof. The pump 36 is driven by a crankshaft 34 of the engine body 10. An inlet 40 of the air pump 36 is connected via an air pipe 41 to a purified space in the air cleaner 12. Thus, an amount of secondary air from the air cleaner 12 can be introduced into the air chamber 26 by the rotation of the crankshaft 34. The air chamber 28 is connected to each branch pipe of the exhaust manifold 16 by an air injection pipe 42 for introducing the secondary air into the exhaust manifold 16. The air chamber 30 is opened to the atmosphere through a port 44 for discharging an excess amount of air therefrom. A first valve seat 46 is formed between the air chamber 26 and the air chamber 28. A second valve seat 48 is formed between the air chamber 26 and the air chamber 30. A valve member 50, for controlling the amount of air directed to the chamber 28 from the chamber 26, is situated between the first valve seat 46 and the second valve seat 48. The valve member 50 is connected via a rod 52 to a diaphragm 54 which is urged by a spring 56. Thus, the position of the valve member 50 with respect to the valve seat 46 or 48 is controlled by a vacuum force generated on the diaphragm 54.

In order to generate a vacuum force on the diaphragm 54, a vacuum signal chamber 58 is formed on one side of the diaphragm 54, which chamber 58 is connectable to a vacuum signal port 70 in the intake manifold 14 by means of a pipe system which will be fully described later.

Numeral 60 designates a vacuum switching valve of an electromagnetic type for selectively connecting the chamber 58 of the flow control valve to the vacuum signal port 70 or to the atmosphere, in order to control the vacuum force of the diaphragm 54 for controlling the amount of secondary air directed to the air injection pipe 42 as shown by an arrow A in FIG. 2. The switching valve 60 has a common port 62, a first switching port 66 and a second switching port 72. The common port 62 is connected to the vacuum signal chamber 58 via a vacuum conduit 64. The first switching port 66 is connected to the vacuum signal port 70 via a vacuum signal intake conduit 68. In this conduit 68, an orifice 78 is formed in order to control the transmission speed of a vacuum signal transmitted from the port 70 to the first switching port 66. The second switching port 72 is opened to the atmosphere via an atmospheric air intake conduit 74. In the conduit 74, an orifice 80 is formed in order to control the speed of introducing the atmospheric air pressure signal from the atmosphere to the second switching port 72. The electromagnetic switching valve 60 has a solenoid 76 for operating the switching valve 60.

When the solenoid coil 76 is energized, the valve 60 is in its first position via which the common port 62 communicates with the first switching port 66. In this first position, a vacuum signal at the vacuum signal port 70 can be introduced into the vacuum signal chamber 58 of the vacuum-operated valve 22, in order to gradually increase the vacuum force applied to the diaphragm 54. This increase in the vacuum force causes the valve member 50 to be moved away from the valve seat 46, so that the amount of air directed to the air injection pipe 42, as shown by the arrow A, is increased. Because of the increase in the amount of the secondary air directed to the air-injection pipe 42, the air-fuel ratio of the exhaust gas in the exhaust pipe 18 connected to the pipe 42 becomes lean (or increased). The rate of increase in the air-fuel ratio corresponds to the rate of movement of the valve body, in other words, to the rate of increase in the vacuum force generated on the diaphragm 54.

When the solenoid coil 76 is de-energized, the switching valve 60 is in its second position via which the common port 62 communicates with the second switching port 72. In this position, atmospheric air is introduced into the signal chamber 58 of the flow control valve 22, in order to gradually decrease the vacuum force applied to the diaphragm 54. This decrease in the vacuum force causes the valve member 50 to be moved toward the valve seat 46, so that the amount of air directed to the air injection pipe 42, as shown by the arrow A, is decreased. As a result of this decrease in the amount of secondary air directed to the exhaust pipe 18 via the air-injection pipe 42, the air-fuel ratio of the exhaust gas in the exhaust pipe 18 becomes "rich" (or is decreased).

Numeral 82 is an oxygen-concentration-cell type sensor, for example, an $O_2$ sensor, which is disposed in the exhaust pipe for providing electric signals indicating the air-fuel ratio of the exhaust gas directed to the three-way catalytic converter 20. As is well known to those skilled in this field, the $O_2$ sensor provides a high-voltage electric signal when the air-fuel ratio of the exhaust gas is rich, and a low-voltage electric signal when the air-fuel ratio is lean.

Numeral 84 is a control device having a comparator unit 86 electrically connected to the $O_2$ sensor 82 at an input 86a of the unit. The control device 84 further has an amplifier unit 88 which is one end thereof connected to an output 86c of the unit 86 and is on the other end thereof connected to the solenoid coil 76 of the vacuum switching valve 60. The voltage level at another input 86b of the comparator unit 86 is lower than the high level signal from the $O_2$ sensor 82 and higher than the low level signal from the $O_2$ sensor 82. Therefore, an output pulse signal is provided at the output 86c when a high level signal, which indicates a rich air-fuel ratio of the exhaust gas in the exhaust pipe 18, is received by the input 86a. This output pulse signal is transmitted, via the amplifier unit 88, to the solenoid coil 76 for energizing coil 76. Thus, the vacuum transmitting valve 60 is switched to its first position via which the common port 62 communicates with the first switching port 66.

When a low-level signal from the $O_2$ sensor 82, which signal indicates a lean air-fuel ratio of the exhaust gas, is received by the input 86a of the comparator unit 86, no output pulse signal is generated at the output 86c. Thus, the solenoid coil 76 is de-energized, causing the vacuum switching valve 60 to be switched to its second position via which the common port 62 communicates with the second switching port 72.

As is described hereinabove, when the air-fuel ratio of the exhaust gas directed to the three-way catalytic converter 20 is rich, the vacuum switching valve 60 is in its first position via which the common port 62 communicates with the port 66. As a result of this, the vacuum force generated on the diaphragm 54 of the flow control valve 22 is gradually increased because the orifice 78 in the conduit 68 is present. Thereby the valve member 50 is moved away from the valve seat 46. Accordingly, the amount of secondary air directed to the air-injection pipe 42, as shown by the arrow A, is increased. The air-fuel ratio in turn is increased to the stoichiometric value thereby causing the three-way catalytic converter 20 to operate effectively. When the air-fuel ratio of the exhaust gas is lean, the vacuum switching valve 60 is in its second position via which the port 62 communicates with the second switching port 72. As a result of this, a vacuum force of the diaphragm 54 is gradually decreased because of the presence of the orifice 80. The valve member 50 is thus moved toward the valve seat 46. Accordingly, the amount of secondary air directed to the injection pipe 42, as shown by the arrow A, is decreased. In addition, the air-fuel ratio is decreased to the stoichiometric value in order to effectively operate the three-way catalytic converter 20.

In the above-mentioned operation of the flow control valve, for effectively controlling the air-fuel ratio of the exhaust gas, a constant rate of increase in the vacuum force on the diaphragm 54, i.e., a constant rate of increase in the amount of secondary air directed to the air injection pipe 42, should be maintained after the electromagnetic valve 60 is switched from its second position to its first position via which the common port 62 communicates with the first switching port 66 which is opened to the vacuum signal port 70 in the intake manifold 14. However, the vacuum signal level at this vacuum signal port 70 is not constant and is therefore decreased, as schematically shown in FIG. 2, in accordance with the increase in the engine load. Consequently, if no means are provided for compensating the difference in the vacuum levels between the high-load condition and the low-load condition, the rate of increase in the vacuum force (corresponding to the rate of movement of the valve member 50) during the low load condition (line $l_1$ in FIG. 3) becomes higher than the rate of increase in the vacuum force during the high load condition (line $l_2$ in FIG. 3). (In FIG. 3, T indicates the time when the electromagnetic valve 60 is switched to its first position from its second position.) Accordingly, the rate of increase in the amount of the secondary air during the high-load condition will become much smaller than the rate of increase in the amount of secondary air during the low-load condition. As a result, an effective control of the air-fuel ratio of the exhaust gas to the stoichiometric value is not carried out, and in turn an effective operation for eliminating toxic components from the exhaust gas by utilizing the three-way catalytic converter 20 cannot be achieved.

According to the present invention, in order to keep a substantially constant rate of increase in the vacuum force on the diaphragm 54, the flow control valve 22 has, on one side of the vacuum signal chamber 58 remote from the diaphragm 54, a second vacuum signal chamber 100. A valve seat 102 is located between these two vacuum signal chambers 58 and 100. A valve member 104, facing the valve seat 102, is connected to a second diaphragm 108 by means of a rod 106. A spring 114 urges the second diaphragm 108 so that the valve member 104 is moved toward the valve seat 102. A vacuum chamber 110, formed on one side of the second diaphragm 108, is connected, via a vacuum signal conduit 112, to the vacuum signal intake conduit 68 opened to the vacuum signal port 70 in the intake manifold 14.

When the engine is operating under a low-load condition, the vacuum level at the vacuum signal port 70 in FIG. 1 is as high as the vacuum level $P_1$ in FIG. 2. Consequently, the vacuum level in the chamber 110, which chamber is opened to the vacuum signal port 70 via the vacuum conduits 112 and 68, becomes high enough to displace the diaphragm 108 against a force of the spring 114 so that the valve seat 102 is detached from the valve seat 104. The first vacuum signal chamber 58 thereby communicates with the second vacuum signal chamber 100 via the valve seat 102. As a result, the vacuum signal of the high level $P_1$ (FIG. 2) at the port 70 is introduced not only into the first vacuum signal chamber 58 but also into the second vacuum signal chamber 100, when the electromagnetic switching valve 60 is switched to its first position at the time T (FIG. 3). The rate of the increase in the vacuum force of the diaphragm 54 after the time T (FIG. 3) is decreased as shown by a line l in FIG. 3, even if the vacuum level at the vacuum signal port 70 is as high as $P_1$ in FIG. 2. The rate of increase in the vacuum force during the low-load condition is determined by $V_1 + V_2$ ($V_1$ is the volume of the first chamber 58, and $V_2$ is the volume of the second chamber 100). The greater the volume of $V_1 + V_2$, the more the rate of increase in the vacuum force is decreased.

When the engine is operating under a high load condition, the vacuum level at the vacuum signal port 70 in FIG. 1 is as low as $P_2$ in FIG. 2. Consequently, the vacuum level in the chamber 110 becomes low enough to cause the diaphragm 108 to be moved by the force of the spring 114 so that the valve seat 102 is seated by the valve member 104. The fluidal communication between the first vacuum signal chamber 58 and the second vacuum signal chamber 100 is therefore prevented. As a result, the vacuum signal of the low level $P_2$ (FIG. 2) at the port 70 is introduced only into the first vacuum signal chamber 58. However, the rate of increase in the vacuum force of the diaphragm 54 after the time T (FIG. 3) can be maintained as shown by the line l in FIG. 3, even if the vacuum level at the port 70 is as low as $P_2$ (FIG. 2), since the rate of increase in the vacuum force during the high load condition is determined only by the volume $V_1$ (FIG. 1) of the first chamber 58.

As is described above, the rate of the increase in the vacuum force on the diaphragm 54 during the high load condition of the engine as well as during the low-load condition of the engine can be equalized as shown by the line l in FIG. 3. Accordingly, the rate of increase in the amount of secondary air directed into the air injection pipe 42 toward the exhaust pipe 18 as shown by the arrow A is substantially maintained at a constant value during every kind of load condition.

As a result, the air-fuel ratio of the exhaust gas is effectively controlled to be near the stoichiometric valve during every kind of load condition in order to effectively operate the three-way catalytic converter 20 for cleaning the three major toxic components in the exhaust gas.

What is claimed is:

1. An exhaust gas cleaning apparatus of an internal combustion engine having an intake system, an engine body and an exhaust system, said apparatus comprising:
   a three-way catalytic converter disposed in said exhaust system, said converter being operable for cleaning three major toxic component in the exhaust gas when the air-fuel ratio of the exhaust gas is maintained near a predetermined value;
   a pipe means for introducing secondary air into said exhaust system located upstream of said three-way catalytic converter;
   a vacuum-operated flow control valve device located on said pipe means, said valve device having a spring-urged diaphragm for forming a main vacuum signal chamber on one side of said diaphragm for operating said diaphragm, in accordance with a vacuum force applied thereto, to control the amount of secondary air directed to said exhaust system;
   a vacuum conduit means adapted for connecting said main vacuum signal chamber with a vacuum signal port formed in the intake system;
   a sensor means arranged in said exhaust system for sensing the air-fuel ratio of the exhaust gas;
   a vacuum signal switching valve arranged in said vacuum conduit means, said switching valve being operated by electric signals transmitted from said sensor means in such a manner that said vacuum signal at said vacuum signal port is selectively transmitted into said main vacuum signal chamber in order to selectively increase and decrease the vacuum force applied to said diaphragm for controlling the amount of secondary air for maintaining the air-fuel ratio of the exhaust gas directed to said three-way catalytic converter near said predetermined value;
   an orifice means arranged in said vacuum conduit means for controlling the transmission speed of said vacuum signal into said the vacuum chamber in order to control the increase in the vacuum force applied to said diaphragm; and
   a vacuum means provided in said flow control valve for maintaining a substantial constant rate of increase in the vacuum force applied to said diaphragm regardless of the vacuum signal level at said vacuum signal port, whereby a substantially constant rate of control of the amount of secondary air passed through said flow control valve toward said exhaust system is maintained in every kind of engine operating condition.

2. An exhaust gas cleaning apparatus according to claim 1, wherein said vacuum means comprises a second vacuum signal chamber formed adjacent to said main vacuum signal chamber, and a vacuum-operated valve means for selectively communicating said second vacuum signal chamber with said main vacuum signal chamber in accordance with the level of vacuum at said vacuum signal port.

3. An exhaust gas cleaning apparatus according to claim 2, wherein said vacuum-operated valve means comprises a valve member adapted for selectively communicating said second vacuum signal chamber with said main vacuum signal chamber, and further comprises a spring-urged diaphragm connected to said valve member, said diaphragm forming a controlling chamber which is connected to said vacuum signal port.

* * * * *